Jan. 23, 1923.                               1,443,123.
G. GIORGINI
ELECTRIC WELDING APPARATUS.
FILED FEB. 16, 1921.                    4 SHEETS—SHEET 4.

Inventor
G. Giorgini
By Marks & Clerk
Attys.

Patented Jan. 23, 1923.

1,443,123

UNITED STATES PATENT OFFICE.

GIUSEPPE GIORGINI, OF GRECO MILANESE, ITALY.

ELECTRIC WELDING APPARATUS.

Application filed February 16, 1921. Serial No. 445,393.

*To all whom it may concern:*

Be it known that I, GIUSEPPE GIORGINI, subject of the King of Italy, and resident of Greco Milanese, Milan, Italy, have invented certain new and useful Electric Welding Apparatus, of which the following is a specification.

This invention relates to an apparatus for electrically welding the flanges of the metal rims of wheels for pneumatic tires and the like, and has as a first object an angular disposition of two rollers carrying the electrodes, in such a manner that the beat discharge falls upon the line of the joint, thus effecting the welding of the rim.

Further objects of the invention are a cooling system of the electrodes obtained by means of a continuous water circulation and the disposition of suitable devices designed to guide the rim, to regulate the largeness of the flange of same and to allow the apparatus to be employed for rims of any diameter whatever.

A form of construction of the invention is, by way of example, indicated in the accompanying drawings, in which.

Figure 4:
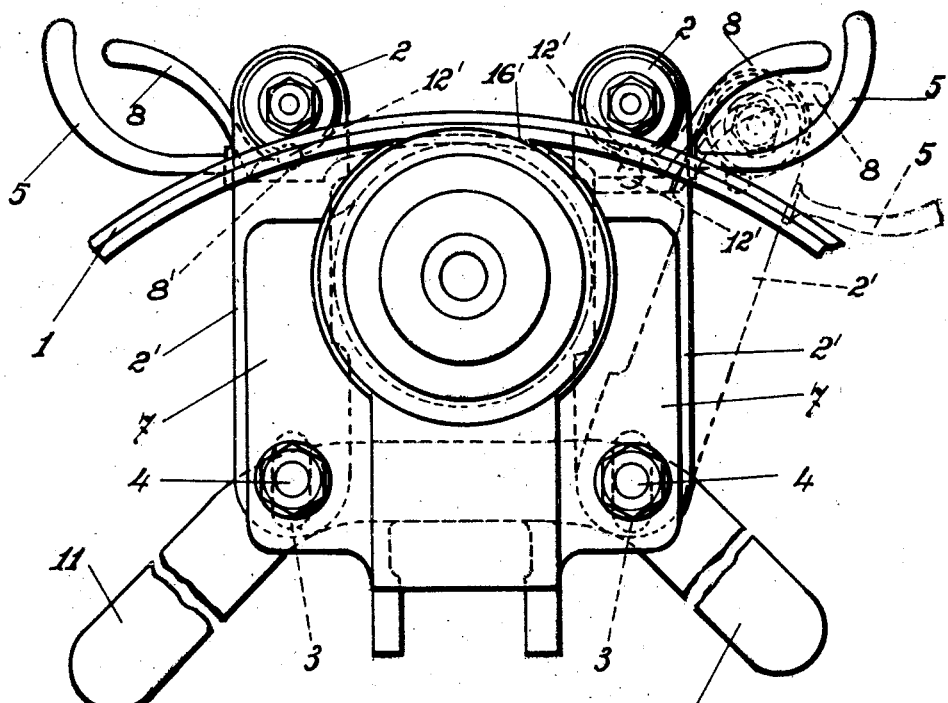
Figure 4 is a somewhat diagrammatical front view of the device designed to feed the rim.
Figure 5:
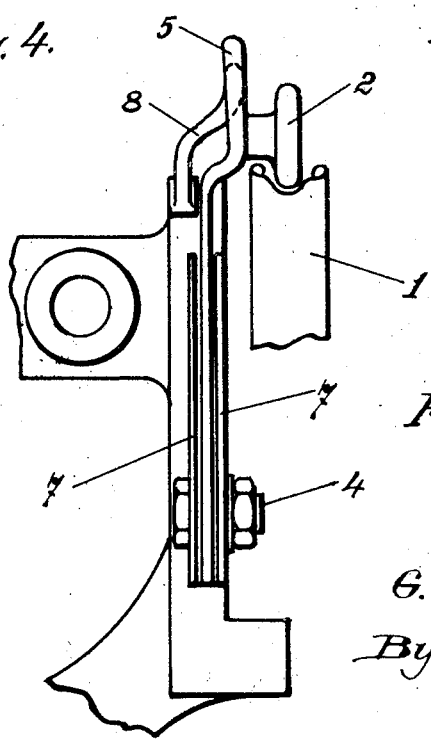
Figure 5 is a side view of Figure 4.

According to the drawings (Figures 4 and 5), 1 is the rim to be welded; 2 are guiding rollers designed to maintain the rim in place, that is adherent to the lower anode 16', said rollers being mounted on the rods 2' which are pivotally connected to the frame 7 of the apparatus by the slot binding 3, this last being adjustable by means of the screw 4. In such a manner the rollers 2, by varying their distance from the pivots 4, may be adapted for any diameter whatever of the rim to be welded.

5 are handles designed to allow the apparatus to be disengaged from the rim in order to remove the latter, said handles 5 being fixedly connected to the corresponding rods 2'.

8 are handles for actuating an elastic stop lever 12 provided with slots 8' which may be engaged on the pins 12' of the rods 2'.

11 are rests fixed to the frame of the apparatus and designed to maintain the rim to be welded on a plane perfectly parallel to the side plane of the lower anode.

Figure 1:
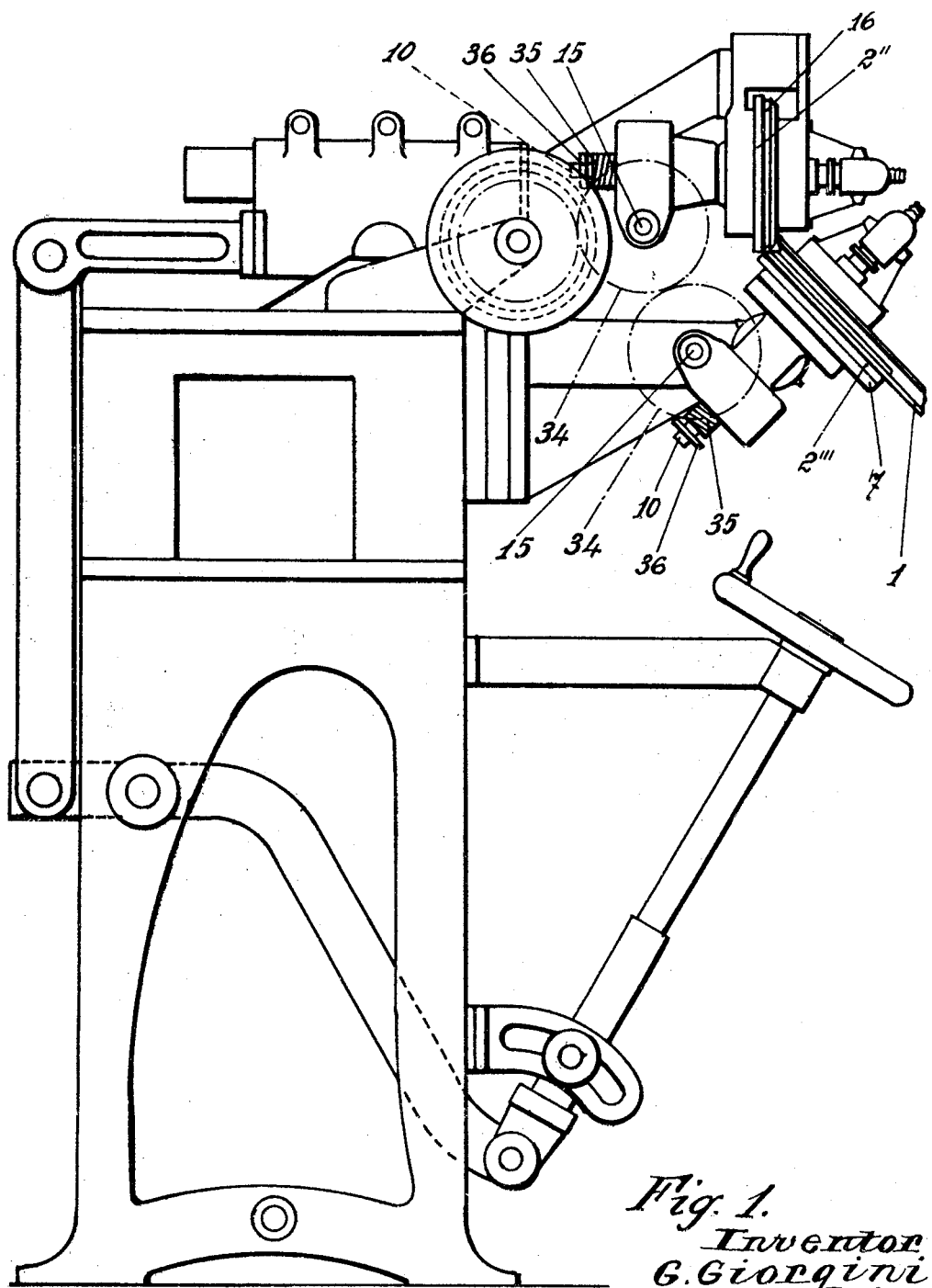
Figure 1 is a complete view of the apparatus.
Figure 2:
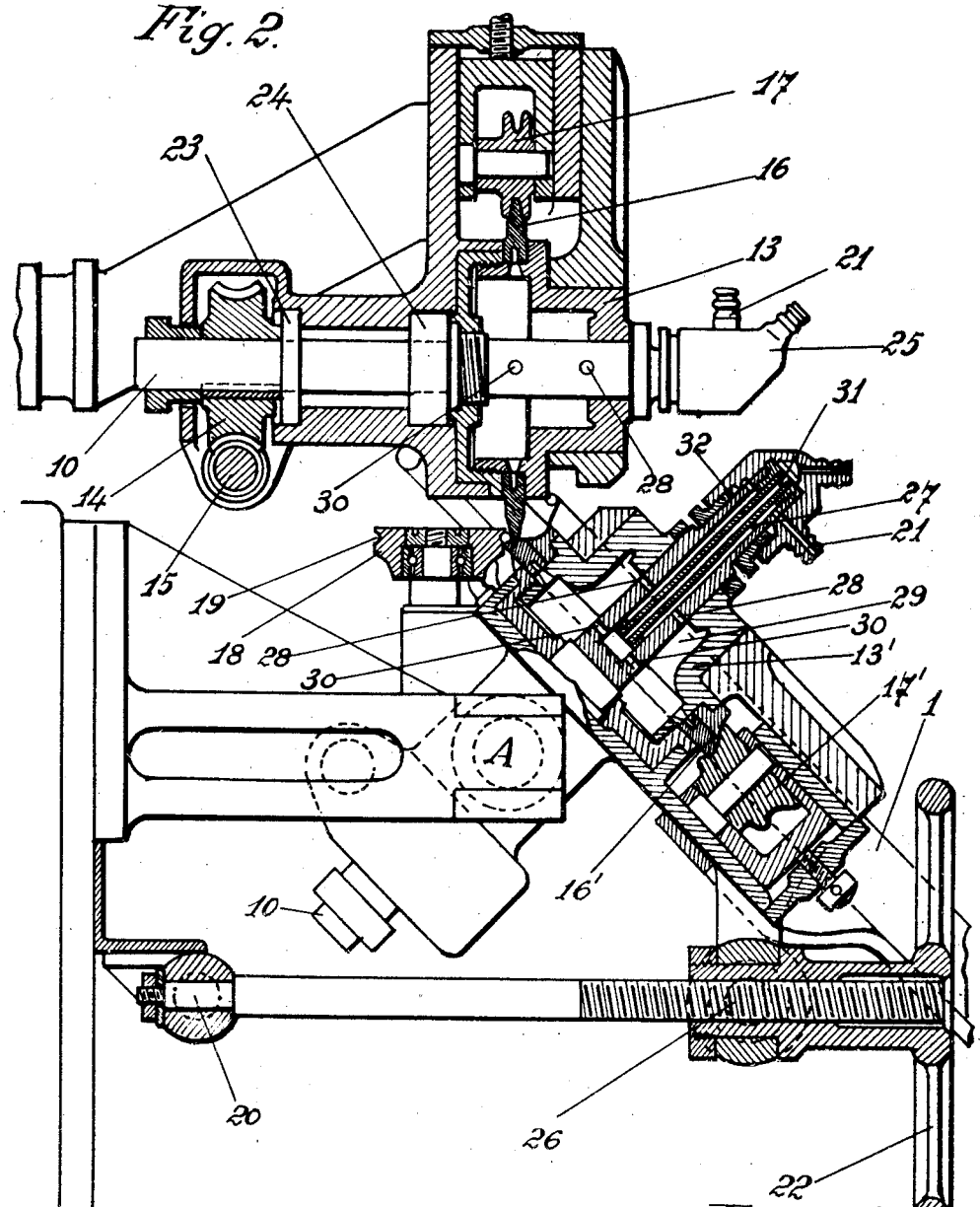
Figure 2 shows the complete apparatus, partly sectioned, on an enlarged scale.
Figure 3:
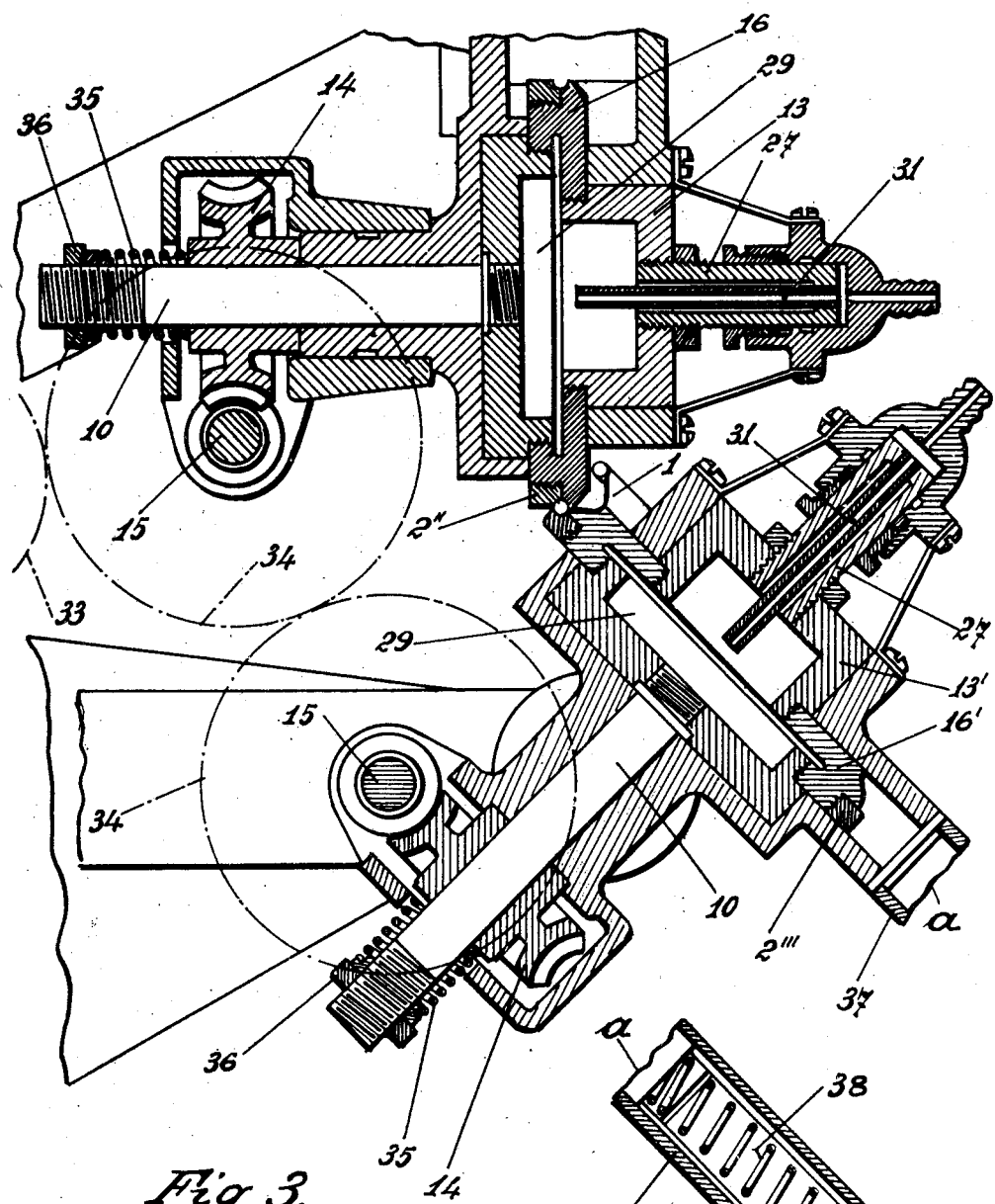
Figure 3 illustrates a modified form of construction of the apparatus.

13 and 13' are revolving rollers respectively carrying the upper anode 16 and the lower anode 16' which are of electrolytic copper and of the shape shown either on Figure 2 or on Figure 3, said rollers forming an angle between them and being mounted on the pivots 10 fixed to the frame of the apparatus. Each of said pivots receives its movement from a worm wheel 14 carried by it and actuated by a pinion 15, said pinions being driven by any suitable gearing, for instance by means of the wheels 34 (Figure 3) from the wheel 33 mounted on the main shaft. The driving shaft 10 may be provided with suitable ball bearings, for instance 23, 24.

17, 17' are two auxiliary rollers (Figure 2), touching the external portion of the anodes 16, 16', and designed to maintain the shape of the anodes constant by revolving under the action of the rollers 13, 13'.

18 is a roller disposed at the centre of the obtuse angle formed by the axis of the rollers 13, 13', said roller 18 being provided with a channelled surface 19 by means of which a subsequent deformation of the flange profile of the rim to be welded is avoided.

22 is a hand wheel for actuating the angular adjustment (by means of a screw spindle pivoted at 20 and of an articulated binding 26) of the lower electrode 16' in order to regulate the disposition of the rim flange in respect to the anodes.

In order to maintain the anodes and the rim cool, a water circulating system has been devised in which the water passes through the nozzle 25 into the pipe 31 pivotally connected to the roller supporting the electrode and from this pipe penetrates, through the holes 30, into the hollow 29 of said roller, thus effecting the cooling of the electrode; from the hollow 29 the water comes out through the holes 28, the pipe 27 and the nozzle 21. In such a manner a continuous water circulation is obtained, which produces the cooling of each roller and of the corresponding anode.

32 is a packing disposed at the end of the pivot 10 to prevent the leakage of the water.

In the modified form of Figure 3, the roller 18 is suppressed and its function of maintaining the shape of the flange of the rim constant is accomplished by two insulated rings 2'', 2''' which are disposed on the rollers 13, 13' against the anodes 16, 16' and the springs 35 are disposed upon the shafts of the rollers 13 and 13' and designed to maintain the worm wheels 14 centered, said springs being applied between the nuts 36 and the hubs of the worm wheels 14. Moreover, the auxiliary rollers 17 and 17' are also suppressed and from the electrode 16' the arms 37 project, which are formed by tubes able to be telescopically lengthened. Within these tubes a rod (not shown on the drawings) slides by overcoming the action of a spring 38, said rod carrying at its end a roller designed to run upon the internal surface of the tire in such a manner as to maintain same in a central position.

It is to be understood that suitable insulating means are disposed both between the electrodes and the other parts of the apparatus.

The working of the apparatus is as follows:

When the revolving rollers 13, 13' are inclined, as shown on the drawings, by means of the pivotal coupling at A actuated by the screw spindle pivoting at 20, 26, the rim 1 to be welded is introduced into the apparatus by the actuation of the handles 8 and 5, in which it will be maintained firmly against the lower anode, in such a manner as to be drawn with the movement of the apparatus when the latter is started. Thus the anodes, which are supplied with an electric current having a very great strength, will effect the electric resistance welding. When the rim is welded, it is removed from the apparatus by actuating, as before mentioned, (see the position illustrated by dotted lines of Figure 4) the handles 8 and 5.

It is to be understood that the particulars of construction and disposition of the apparatus may be varied without departing from the scope of the invention.

Having now particularly described and ascertained the nature of my said invention and in what manner the same is to be performed, I declare that what I claim is:—

1. An apparatus for electrically welding the flanges of the metal rims of the pneumatic tire wheels, of the kind provided with two electrode rollers forming an angle between them, said electrodes being cooled by a continuous water circulation, comprising two rollers for fixing the tire upon the lower anode, said rollers being adjustable, according to the diameter of the tire, by means of a slot binding system disposed at the ends of the supporting rods of these rollers, handles for stopping the rim and handles for removing the welded rim from the apparatus.

2. An apparatus for electrically welding the flanges of the metal rims of the pneumatic tire wheels of the kind provided with two electrode rollers forming an angle between them, said rollers being cooled by a continuous water circulation, comprising two rollers for fixing the tire upon the lower anode, said rollers being adjustable, according to the diameter of the tire, by means of a slot binding system at the ends of the supporting rods of these rollers, and a pivoting system of the device carrying the lower anode, to the end of regulating the quantity of flange to be treated by the upper anode for the welding process.

3. An apparatus for electrically welding the flanges of the metal rims of the pneumatic tire wheels, of the kind provided with two electrode rollers forming an angle between them, said electrodes being cooled by a continuous water circulation, comprising two rollers for fixing the tire upon the lower anode and an auxiliary roller disposed at the center of the obtuse angle formed by the axis of the rollers carrying the anodes, said auxiliary roller being designed to maintain unvaried the external profile of the metal rim.

4. An apparatus for electrically welding the flanges of the metal rims of the pneumatic tire wheels, of the kind provided with two electrode rollers forming an angle between them, comprising two auxiliary rollers touching the external portion of the anodes and designed to maintain unvaried the shape of said anodes by means of suitable slots formed at their surface, and another auxiliary roller disposed at the center of the obtuse angle formed by the axis of the rollers carrying the anodes.

5. An apparatus for electrically welding the flanges of the metal rims of the pneumatic tire wheels, of the kind provided with two electrode rollers forming an angle between them, comprising arms projecting from the carrier of the lower electrode, which are formed by tubes able to be telescopically lengthened, a rod running within these tubes, which carries a roller designed to run, under the action of a spring, upon the internal surface of the rim.

Signed at Milan, Italy, this 29th day of January, A. D. 1921.

GIUSEPPE GIORGINI.